United States Patent

Waggoner et al.

[11] 3,979,840
[45] Sept. 14, 1976

[54] TEACHING AND MEASURING BOX

[76] Inventors: Burnal E. Waggoner, c/o George Spector, 3615 Woolworth Bldg., 233 Broadway; George Spector, 3615 Woolworth Bldg., 233 Broadway, both of New York, N.Y. 10007

[22] Filed: May 12, 1975

[21] Appl. No.: 576,843

[52] U.S. Cl. .............................. 35/22 R; 273/105 R; 273/153 R
[51] Int. Cl.² ...................... G09B 19/00; A63F 7/04
[58] Field of Search ................ 35/22 R; 273/153 R, 273/153 S, 105 R, 105 A, 109, 113, 85 D

[56] References Cited
UNITED STATES PATENTS 2,729,020  1/1956  Frampton ................... 273/153 R X
3,406,971  10/1968  Koff ............................ 273/109
3,653,661  4/1972  Leonhart ..................... 273/85 D

FOREIGN PATENTS OR APPLICATIONS 2,359  3/1892  United Kingdom ................. 273/109

*Primary Examiner*—William H. Grieb

[57] ABSTRACT

A device for developing and also determining the ability of a child or adult in solving a logical problem; the device in its most elementary form consisting of a closed rectangular box having a transparent front side to allow observation inside, the box having an opening near a pair of diagonally opposite corners so a reward such as a candy or the like is dropped through one of the openings into the box interior after which the opening is closed, and a player then attempts to shake the reward out of the other opening in a minimum time and claim the reward.

2 Claims, 6 Drawing Figures

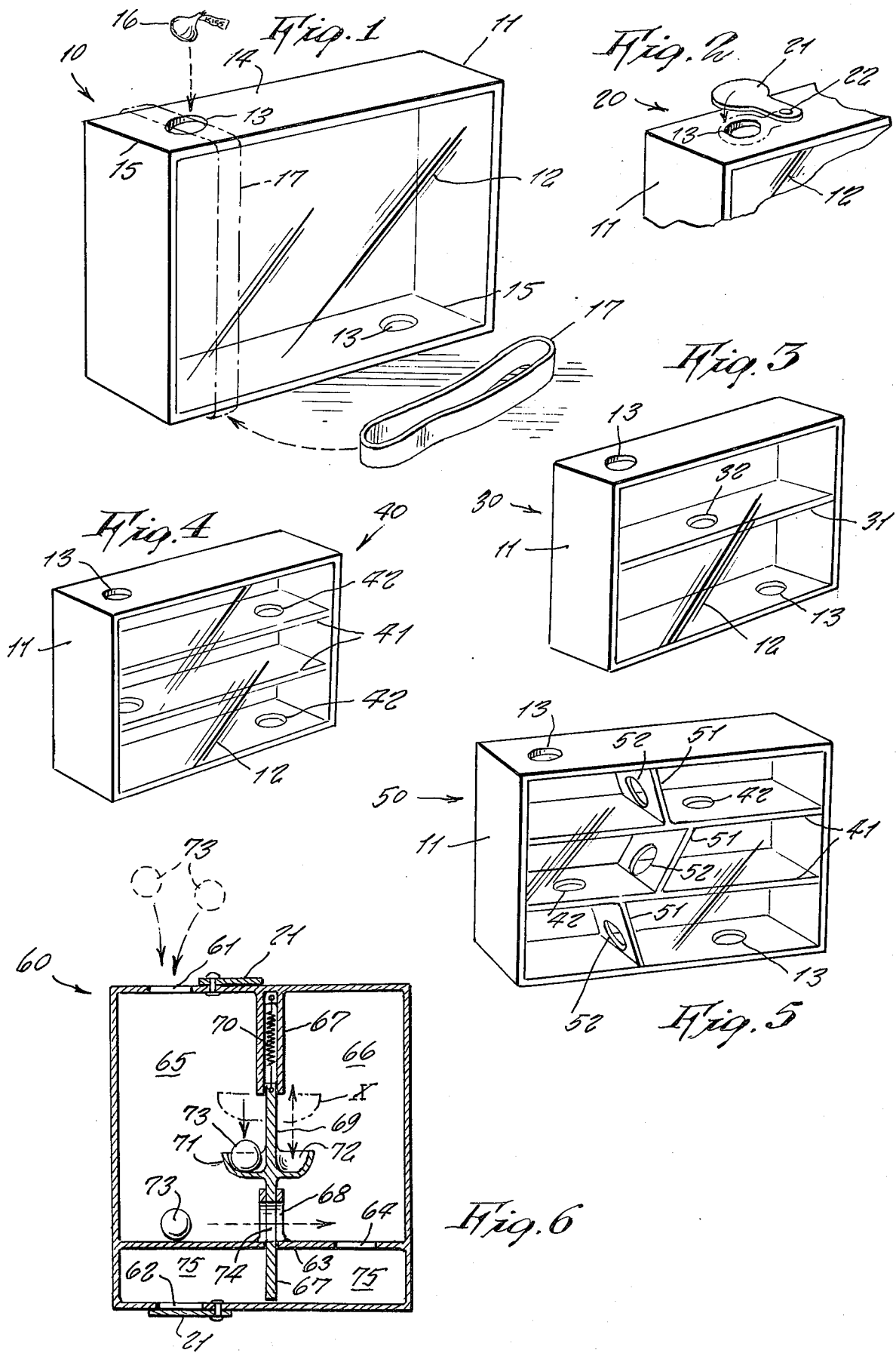

TEACHING AND MEASURING BOX

This invention relates generally to puzzle boxes.

A principal object of the present invention is to provide a puzzle box which aids in developing or testing a player's logic by moving a playing piece through a box in a measured minimum length of time so to rate his intelligence.

Another object is to provide a puzzle box which can be used on all persons, children and adults, and which at a same time is fun to operate.

Still another object is to provide a puzzle box for teaching hand-eye coordination, problem solving and eye coordination for reading, or which can be used to evaluate skill in hand-eye coordination, determine level of problem solving ability, measure attention mechanical ability, for either pre school, elementary school or older students or for adults, or which may be used for the mentally retarded.

Other objects are to provide a teaching and measuring box which is simple in design, inexpensive to manufacture, rugged in construction, easy to use and efficient in operation.

These and other objects will be readily evident upon a study of the following specification and the accompanying drawing wherein:

FIG. 1 is a perspective view of a simple form of the invention with entry and exit openings on opposite ends.

FIG. 2 is a detail thereof wherein a rotatable closure cap is used instead of a rubberband of FIG. 1 so to not block the front window.

FIG. 3 is a view similar to FIG. 1 except that the device includes a single partition inside with opening therethrough.

FIG. 4 is a view similar to FIG. 3 except that it includes two partitions with opening in each.

FIG. 5 is a view similar to FIG. 4 except that it includes additionally inclined baffles that must be crossed over by the candy.

FIG. 6 is a cross sectional view of a modified design of the invention which is for use with two pieces of candy at a same time, and which includes a slidably vertical gate activated by a weight of one of the candies so to clear a passage for the other candy to move therethrough, and wherein after a first candy goes through the passage it must then be used as the weight that activates the gate so that the other candy then gets through; this form of the invention thus requiring more advanced logic so the operator gets two candies, instead of one.

Referring now to the drawing in detail, and more particularly to FIG. 1 thereof at this time, the reference numeral 10 represents a teaching and measuring box according to the present invention wherein there is a rectangular, wooden box 11 having a front wall 12 made of transparent plexiglass so to allow viewing into the box. An opening 13 is made through a pair of opposite side walls 14, the openings being located near diagonally opposite corners 15.

In playing with the puzzle, a reward such as a candy 16 is dropped through one of the openings into the interior of the box, and this opening is then sealed by means of a rubberband 17 placed around the outside of the box so that this opening cannot be then used, and a player is then obliged to turn or shake the box so to bring the reward inside the box to the other opening and dispense the reward outwardly therefrom in minimum time.

In FIG. 2, a modified design of the puzzle box 20 eliminates the use of the above described rubberband, by each opening 13 being made selectively closable by means of a cover 21 pivotable about a rivet 22 so to be either in an open position as shown in solid lines, or in a closed position as shown by the dotted lines.

In FIG. 3, a modified design of the puzzle box 30 is the same as puzzle box 10 except that it additionally includes a central partition 31 having opening 32 so that a player is obliged to move the reward through the additional opening in order to move it on its course toward its discharge opening.

In FIG. 4 another design of puzzle box 40 is the same as box 30 except that it has two partitions 41 each with opening 42. It is to be noted that all the openings are disaligned so the prize must travel a zig zag course through the box.

In FIG. 5 a puzzle box 50 is the same as box 40 except that it additionally includes inclined baffles 51 each with an opening 52 so to further intercept the travel course of the prize.

In FIG. 6 a further modified design of puzzle box 60 has entrance opening 61 and exit opening 62 and also a horizontal partition 63 having opening 64. Additionally, the interior of the box is further divided into side by side compartments 65 and 66 by means of a vertical double wall 67 having opening 68 therethrough, the opening 68 being normally kept closed by a vertically slidable door 69 supported inside the double wall, the door being suspended on a tension spring 70. Each side of the door has a pocket 71 and 72 integral therewith.

In working the puzzle box 60, two rewards such as ball gum 73 or other prizes are used at a same time. Both rewards 73 are dropped through opening 61 into compartment 65 and the top cover 21 is then closed. The rewards cannot leave the compartment 65 unless the opening 68 is first opened up by sliding the door 69. This is accomplished by shaking or turning the box until one of the rewards gets into pocket 71 which thus increases the weight of the door so the tension spring is stretched causing the door to be lowered from the position shown by dotted lines X to the position as shown by solid lines in the FIG. 6, thus causing an opening 74 of the door to align with partition opening 68, thus permitting the other of the rewards to go therethrough and into the compartment 66. After this is accomplished, the reward is shaken out of pocket 71, causing the door to again close the opening 68, so it still remains inside compartment 65. The other reward that is now inside compartment 66 is then gotten into pocket 72 causing the door to again be lowered so that opening 74 aligns with opening 68, thus allowing the reward that was left in the compartment 65 to now also pass into the compartment 66, so that now both rewards have gotten through, and are both free to continue their travel through the next opening 64. The door being again raised automatically, allows both rewards then to travel through compartment 75 toward the exit opening 62 and out of the box.

Thus different forms of the invention have been provided.

While various changes may be made in the detail construction it is understood that such changes will be within the spirit and scope of the present invention, as is defined by the appended claims:

What is claimed is:

1. In a teaching and measuring box, the combination of a wooden box member having a front side made of transparent plexiglass to allow observation thereinto, an upper and lower wall of said box each having an opening for passage of a reward article through said box, said openings being axially disaligned respective to each other, and a means for selectively closing said opening through said upper wall, including a vertically movable panel mounted in said box dividing said box into two spaces, in further combination with gravity actuated means for moving the panel from a closed position to a position providing communication between said spaces, said box additionally including at least one partition therewithin with an opening through said partition for passage of said reward therethrough, wherein the panel is spring biased to the closed position.

2. The combinatin as set forth i claim 1 wherein said box additionally includes a vertical double wall forming the side by side spaces, an opening through said double wall, said panel being a vertically slidable door within said double wall being suspended by a tension spring, an opening through said door being normally disaligned with said double wall opening, said means comprising a pocket on each side of said door, one said pocket accordingly, being in one space, and the other pocket being in the other said space, and a pair of said rewards being used at a same time for effecting movement of the rewards through said box.

* * * * *